June 10, 1969 K. G. SLOTKOWSKI 3,449,550
TEMPERATURE CONTROL APPARATUS
Filed Dec. 13, 1965 Sheet 1 of 2

INVENTOR.
KENNETH G. SLOTKOWSKI
BY Whittemore
Hulbert & Belknap
ATTORNEYS

United States Patent Office 3,449,550
Patented June 10, 1969

3,449,550
TEMPERATURE CONTROL APPARATUS
Kenneth G. Slotkowski, Oak Park, Mich., assignor, by mesne assignments, to Ritter Pfaudler Corporation, Rochester, N.Y., a corporation of New York
Filed Dec. 13, 1965, Ser. No. 513,169
Int. Cl. H05b 1/02
U.S. Cl. 219—502
12 Claims

ABSTRACT OF THE DISCLOSURE

A temperature controller which has a sensing element that responds to the temperature to be controlled and a control element that maintains the desired temperature. The control element, which preferably is a silicon controlled rectifier, can be varied continuously through the range from full power application to zero power application. This smooth application of continuously varied power to the heating elements provides precise temperature control without the undershoot and overshoot of on-off controllers. This smoothly variable application of power to the heating elements also minimizes the effect of thermal shock to the elements and greatly prolongs their useful life.

---

The invention relates to temperature controls and refers more specifically to structure for controlling the temperature of a furnace or the like within very narrow limits.

In the past temperature controls have lacked sensitivity so that it has been difficult to maintain a selected temperature with accuracy. Also, prior furnace controls have usually operated on an on-off-principle so that furnace heating elements controlled thereby have been maintained in a fully on or a fully off condition depending on whether the temperature sensed by the control has been above or below the selected temperature. Constant hunting of the temperature control about the selected temperature has thus been normal with past temperature controls.

Such prior temperature control structures besides being unable to maintain a selected temperature within desired limits have the disadvantage of higher peak load on heating elements. In addition, on and off operation causes shock loading of the heating elements. Both higher peak load and shock loading are, of course, detrimental to heating elements.

It is therefore an object of the present invention to provide an improved temperature control.

Another object is to provide a temperature control which is continuous in operation rather than operating on an on-off principle.

Another object is to provide temperature control structure including means for energizing a heating element during each half cycle of an alternating electric signal and means for varying the time of energizing the heating element during each half cycle responsive to a sensed temperature.

Another object is to provide a heater control which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
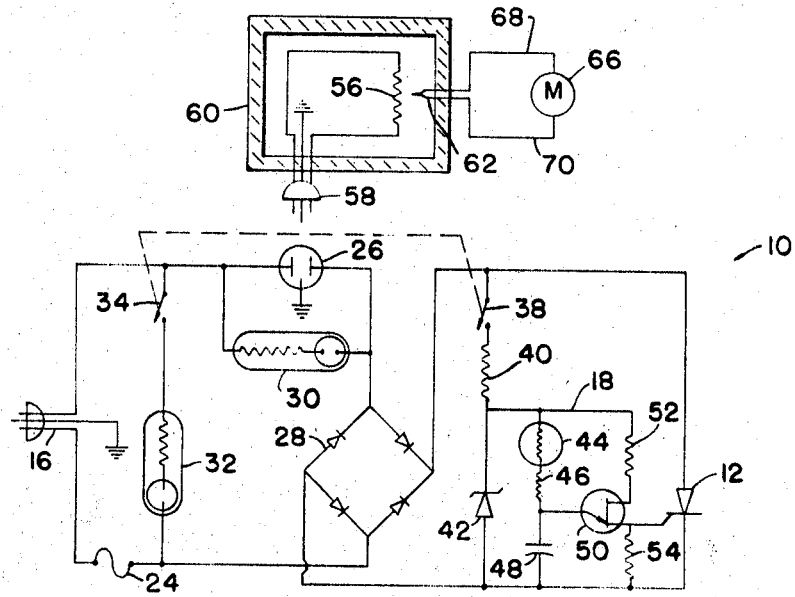
FIGURE 1 is a schematic diagram of a temperature control constructed in accordance with the invention.

As shown in FIGURE 1, the temperature control 10 includes switch means 12 connected in series with a heater element 56 across a source of alternating electrical energy 16. Temperature control 10 further includes the trigger structure 18 responsive to the temperature in furnace 60 for actuating the switch means 12 at a time in each half cycle of the alternating electric signal input determined by the temperature to be controlled.

More specifically the source of alternating electric energy 16 is a plug which may be connected to the usual sixty cycle alternating electric signal source. The wave form for the source of electric energy at the plug 16 is shown as wave form 22 in FIGURE 4.

Plug 16 is connected through fuse 24 and across socket 26 to the input terminals of the full wave rectifier 28 as illustrated in FIGURE 1. An indicator light 30 is connected across the socket 26 to provide an indication that an electric signal is present at the temperature control 10. In addition, a second light 32 is electrically connected in parallel with the series circuit including the input terminals of the rectifier 28 and the socket 26 across the plug 16 through the switch 34.

The switch means 12 of the temperature control 10 illustrated in FIGURE 1 is a silicon controlled rectifier connected across the output terminals of the full wave rectifier 28. When the silicon controlled rectifier 12 is triggered to conduct, the rectifier 28 will be shorted through the silicon controlled rectifier 12 whereby substantially the full energy of the alternating input signal will be dissipated in a load placed across the socket 26.

The trigger structure 18 includes a switch 38, a voltage dropping resistor 40 and a Zener diode 42 connected in series across the output terminals of the rectifier 28 to provide a regulated voltage across the Zener diode 42 when the switches 34 and 38 are closed, a load is placed across the socket 26, and the plug 16 is connected across a source of electrical energy. The switches 34 and 38 are, as shown, connected together for simultaneous operation.

The trigger structure 18 further includes a light sensitive resistor 44, a current limiting resistor 46 and a capacitor 48 connected in series across the Zener diode 42 and a unijunction transistor 50 having the emitter connected between the voltage dropping resistor 46 and capacitor 48 and base connections through resistors 52 and 54 to one side of the light sensitive resistor 44 and one side of the capacitor 48, respectively, as shown best in FIGURE 1. The control electrode gate of the silicon controlled rectifier 12 is connected between the resistor 54 and one base of the unijunction transistor 50 again as shown in FIGURE 1.

The heater element 56 is connected in series with the terminals of plug 58. The plug 58 mates with the socket 26 to place the heater element 56 in series with the rectifier 28 across the source of electric energy 16. As shown the heater element 56 is positioned in a furnace 60 which it is desired to maintain at a seelcted temperature. The temperature in the furnace 60 will depend on the electric current passed through the heater element 56.

The temperature sensitive thermocouple 62 is positioned in the furnace 60 and generates an electric signal which is representative of the temperature within the furnace 60. The electric signal from the thermocouple 62 is applied to the movement 64 of the meter 66 over conductors 68 and 70 to rotate the output shaft 72 of the meter movement 64 and the indicator needle 74 secured thereto for rotation therewith, whereby an indication of the temperature in the furnace is provided on the meter 66, as illustrated best in FIGURES 2 and 3.

Figure 3:
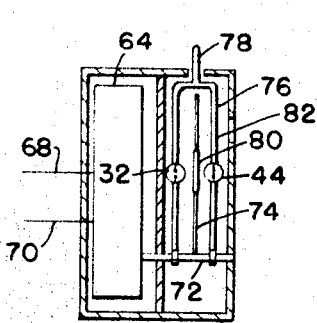
FIGURE 3 is a section view of the meter structure illustrated in FIGURE 2 taken substantially on the line 3—3 in FIGURE 2.

The light 32 and light sensitive resistor 44, as shown best in FIGURE 3, are connected to a rigid yoke structure 76 for rotation about the output shaft 72 of the meter movement 64 to a position representative of a selected temperature which it is desired to maintain in the furnace 60 by means of the setting tab 78 on the yoke 76 extending through the top of the meter 66. The meter indicator needle 74 is positioned between the light 32 and light sensitive resistor 44, as shown in FIGURE 3, and includes a light shield 80 thereon, as illustrated best in FIGURE 2.

Thus, in operation, a particular temperature at which it is desired to maintain the furnace 60 is selected and the light 32 and light sensitive resistor 44 are pivoted about the output shaft 72 of the meter movement 64 until the portion 82 of the yoke structure 76 indicates the selected furnace temperature. With the light 32 and light sensitive resistor 44 so set, the plug 16 is connected to the usual source of alternating electric energy as indicated by wave form 22 in FIGURE 4 and the switches 34 and 38 are closed.

With the plug 58 secured in socket 26 electric energy will pass through the heater element 56, through the full wave rectifier 28 and be applied across the voltage divider structure including the resistor 40 and Zener diode 42. The electric signal across the Zener diode 42 will be clipped in accordance with the wave form 84 illustrated in FIGURE 4. This clipped electric signal is passed across the light sensitive resistor 44 and resistor 46 to charge capacitor 48. Some time after the start of a cycle of the alternating electric signal the charge on the capacitor 48 will be sufficient to fire the unijunction transistor 50 whereby the capacitor 48 will be rapidly discharged through the resistor 54 to provide a trigger pulse on the control electrode of the silicon controlled rectifier 12. Thus during each half cycle of the input electric signal, the silicon controlled rectifier 12 will at some time conduct to short the rectifier 28, applying substantially the full energy of the electric energy source 16 across the heater element 56 through socket 26 and plug 58 to heat the furnace 60.

As the temperature in the furnace 60 approaches the selected temperature the indicator needle 74 will move toward alignment with the yoke structure 76 supporting the light 32 and light sensitive resistor 44 in the selected position representing the selected furnace temperature. With the indicator needle in line with the yoke structure the shield 80 will shield the resistor 44 from the light 32, whereby as the indicator needle 74 approaches the light 32 and resistor 44, the resistance in series with the capacitor 48 will gradually increase, increasing the charge time of the capacitor 48. Thus, during each half cycle of the input electric signal the unijunction transistor will be fired later than during the previous half cycle as the temperature in the furnace 60 approaches the selected temperature.

Figure 2:
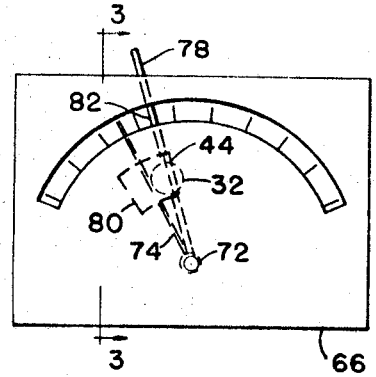
FIGURE 2 is an enlarged front view of the meter structure used in the temperature control of FIGURE 1.
Figure 4:
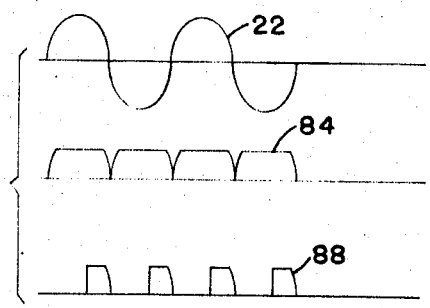
FIGURE 4 is a diagrammatic representation of the electric signal at different locations in the temperature control of FIGURE 1.

At the selected furnace temperature the unijunction transistor 50 will be fired at a time during each half cycle of the input electric signal to trigger the silicon controlled rectifier and short out the rectifier 28 to provide an output to the heater element 56 as illustrated by wave form 88 of FIGURE 4 which electric signal is just sufficient to maintain the furnace 60 at the selected temperature. If the furnace temperature falls below the selected temperature, the indicator needle 74 and flag 80 will move counterclockwise, as shown in FIGURE 2, to provide less resistance in series with the capacitor 48 as the result of action between the light 32 and light sensitive resistor 44 so that larger pulses of electricity will pass through the heater element 56 during each half cycle of the input electric energy to bring the furnace temperature back up to the selected furnace temperature.

Conversely, if the temperature in the furnace 60 goes above the selected temperature the interaction between the light 32 and light sensitive resistor 44 will be such in conjunction with the shield 80 that it will take a longer time for the capacitor 48 to charge during each half cycle of the input electric energy so that the electric signal passing through the heater element 14 will be lower to lower the temperature in the furnace 60.

Thus, it will be seen that there is provided in accordance with the invention a temperature control which is substantially continuous in operation rather than having on-off characteristics so that hunting about the selected temperature is substantially eliminated and very accurate temperature control maintained. Further, in accordance with the invention it will be seen that shock loading of the heater element and excessive peak heater temperatures are eliminated, thus providing longer heater life. Also, it will be understood that the temperature control 10 is particularly simple and efficient whereby economical temperature control is accomplished.

Figure 5:
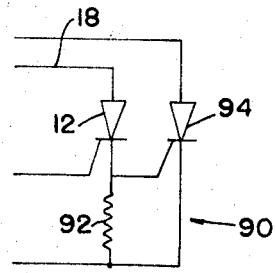
FIGURE 5 is a partial schematic illustration of a modification of the temperature control shown in FIGURE 1.

If higher current carrying capabilities are desired than are practical with the characteristics of the silicon controlled rectifier 12, a modified temperature control 90, as illustrated in FIGURE 5, may be provided in which a resistance 92 is added in series with the silicon controlled rectifier 12 and the silicon controlled rectifier 12 is used to trigger a second high power silicon controlled rectifier 94.

Figure 6:
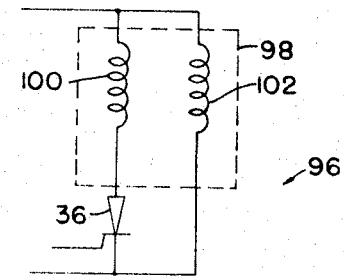
FIGURE 6 is a partial schematic illustration of another modification of the temperature control illustrated in FIGURE 1.

If even larger current capabilities are required than can be accommodated by the modified temperature control 90, a temperature control 96, as shown in FIGURE 6, may be provided, wherein the silicon controlled rectifier 12 is used to trigger the magnetic amplifier 98 having the control winding 100 in series with the silicon controlled rectifier 12 and the power winding 102 in series with the rectifier 28 and the load as shown in FIGURE 1. Thus, a current range of up to three thousand amperes may be accommodated by the temperature controls constructed in accordance with the invention.

Figure 7:
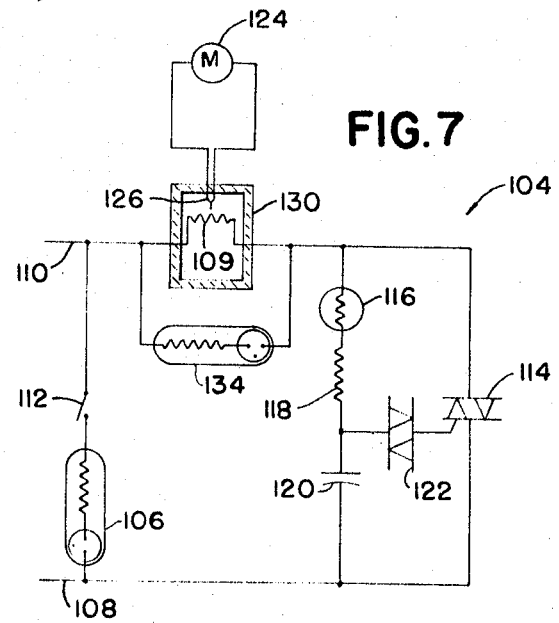
FIGURE 7 is a schematic diagram of still another modification of the temperature control of the invention.

The modified temperature control 104 illustrated in FIGURE 7 includes the light 106 connected directly across a source of alternating electric energy from conductors 108 and 110 through switch 112. The heater element 109 is connected directly across the source of electric energy in series with a bilateral switch 114. The trigger means for the bilateral switch 114 includes the light sensitive resistor 116, voltage dropping resistor 118 and capacitor 120 connected in parallel with the bilateral switch 114 and a bilateral three layer trigger diode 122, one terminal of which is connected between the resistor 118 and the capacitor 120 and the other terminal of which is connected to the control electrode of the bilateral switch as shown in FIGURE 7.

In operation the resistance of the light sensitive resistor 116 is varied in conjunction with the light 106 by means of meter 124 connected to the temperature sensitive thermocouple 126 responsive to the temperature in the furnace 130 as considered in conjunction with the temperature control 104. Indicator light 134 is again provided to indicate operation of the temperature control 104.

Thus during each half cycle of an electric input signal the capacitor 120 is charged through the variable resistance including resistors 116 and 118 to fire the bilateral three layer trigger diode 122 at different times, thus firing bilateral switch 114 to keep the electric circuit across the energy source and apply the full energy of the source to the heater element 109. Again the time during each half cycle at which the alternating input signal is placed across the heater element 109 will be determined by the resistance of the variable resistor 116 which is controlled by the position of a flag on the indicator of meter 124.

Figure 8:
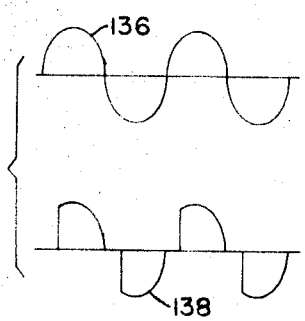
FIGURE 8 is a diagrammatic representation of the electric signal at different locations in the temperature control of FIGURE 7.

The input electric signal to the heater control 104 will be substantially as the wave form 136 in FIGURE 8. The wave form across the heater element 109 will be substantially as wave form 138 in FIGURE 8.

While one embodiment of the present invention and modifications thereof have been considered in detail, it will be understood that other embodiments and modifications are contemplated. It is the intention to include all embodiments and modifications as are defined by the appended claims within the scope of the invention.

What I claim as my invention is:

1. Temperature control structure comprising a source of alternating electric energy, a heater element for providing a temperature to be controlled in accordance with electric energy passed therethrough, switch means in series with the heater element across the source of electric energy, variable resistance means in series with capacitator means, said means together being in parallel with the switch means for triggering the switch means at a predetermined time during each half cycle of the input electric signal in accordance with the resistance thereof and means responsive to the temperature to be controlled for varying the resistance of said resistance means.

2. Structure as set forth in claim 1 wherein the switch means comprises a silicon controlled rectifier.

3. Structure as set forth in claim 2 wherein the variable resistance means comprises a variable resistor in series with a capacitor connected across the silicon controlled rectifier, means for varying the variable resistor in accordance with the temperature to be controlled and a unijunction transistor having the emitter connected between the variable resistor and the capacitor, a first base connected across the variable resistor and a second base connected through a resistor across the capacitor and directly to the control electrode of the silicon controlled rectifier.

4. Structure as set forth in claim 2 wherein the variable resistance means comprises a variable resistor and a capacitor in series across the silicon controlled rectifier, a unijunction transistor having an emitter connected between the variable resistor and capacitor, a first base connected across the variable resistor, a second base connected through a resistance across the capacitor, a second silicon controlled rectifier connected across the first mentioned silicon controlled rectifier in series with a resistor and including a control electrode connected directly to the second base of the unijunction transistor, the control electrode of the first mentioned silicon controlled rectifier being connected across the resistance and second silicon controlled rectifier in series.

5. Structure as set forth in claim 1 wherein the switch means is a magnetic amplifier having a control winding.

6. Structure as set forth in claim 5 wherein the variable resistance means comprises a variable resistor and a capacitor in series across the switch means, a unijunction transistor having an emitter connected between the variable resistance and capacitor, a first base connected across the variable resistor, a second base connected through a resistor across the capacitor, a silicon controlled rectifier connected in series with the control winding of the magnetic amplifier and in parallel with the variable resistor and capacitor and having a control electrode connected directly to the second base of the unijunction transistor.

7. Structure as set forth in claim 1 wherein the switch means is a bilateral switch.

8. Structure as set forth in claim 7 wherein the trigger means comprises a variable resistor and capacitor in series across the bilateral switch and a bilateral three layer trigger diode having one terminal connected between the variable resistance and capacitor and the other terminal connected to the control electrode of the bilateral switch.

9. Structure as set forth in claim 1 wherein the means responsive to temperature for varying the variable resistance comprises a thermocouple for generating an electric current proportional to the temperature to be controlled, a light source, a light sensitive resistor positioned adjacent the light source and means responsive to the electric signal generated by the thermocouple for variably shielding the light sensitive resistor from the light source.

10. Structure as set forth in claim 9 wherein the means responsive to the electric signal includes a meter for receiving the electric signal from the thermocouple including an indicator having a shield thereon movable between the light source and light sensitive resistor in response to the electric signal from the thermocouple, and means for setting the light source and light sensitive resistor at predetermined selected positions relative to movement of the indicator corresponding to a selected temperature.

11. Structure as set forth in claim 1 wherein said variable resistance means is light sensitive.

12. Structure as set forth in claim 11 wherein said switch means comprises a silicone control rectifier.

References Cited

UNITED STATES PATENTS

| | | |
|---|---|---|
| 2,939,064 | 5/1960 | Momberg et al. |
| 3,149,224 | 9/1964 | Horne et al. |
| 2,954,479 | 9/1960 | Cibelius. |
| 2,998,547 | 8/1961 | Berman. |
| 3,129,381 | 4/1964 | Manteuffel. |
| 3,300,622 | 1/1967 | Swain. |
| 3,244,965 | 4/1966 | Gutzwiller. |
| 3,331,013 | 7/1967 | Cunningham. |
| 3,368,140 | 2/1968 | Tobey. |
| 3,348,131 | 9/1967 | Banks. |

BERNARD A. GILHEANY, *Primary Examiner.*

F. E. BELL, *Assistant Examiner.*